United States Patent [19]

Nagano et al.

[11] Patent Number: 5,408,482
[45] Date of Patent: Apr. 18, 1995

[54] APPARATUS FOR AND METHOD OF CONTROLLING THE OUTPUT OF A LASER SOURCE

[75] Inventors: Osamu Nagano; Masanori Mizuno; Tsukasa Fukushima, all of Aichi, Japan

[73] Assignee: Mitsubishi Denki Kabushiki Kaisha, Tokyo, Japan

[21] Appl. No.: 8,622

[22] Filed: Jan. 25, 1993

[30] Foreign Application Priority Data

Jan. 24, 1992 [JP] Japan .................... 4-010975

[51] Int. Cl.⁶ .......................................... H01S 3/133
[52] U.S. Cl. ........................................ 372/31; 372/33
[58] Field of Search ................. 372/29, 30, 31, 33, 372/38

[56] References Cited

U.S. PATENT DOCUMENTS

| | | | |
|---|---|---|---|
| 3,806,829 | 4/1974 | Duston et al. | |
| 4,630,273 | 12/1986 | Inoue et al. | 372/19 |
| 4,849,980 | 7/1989 | Shoji et al. | 372/31 |
| 4,912,714 | 3/1990 | Hatanaka et al. | 372/31 |
| 5,025,447 | 6/1991 | Ohashi | 372/31 |
| 5,163,063 | 11/1992 | Yoshikawa et al. | 372/31 |
| 5,334,826 | 8/1994 | Sato et al. | 372/29 |

FOREIGN PATENT DOCUMENTS 3930495 3/1991 Germany .
57-202794 12/1982 Japan .

OTHER PUBLICATIONS

IBM Technical Disclosure Bulletin, H. E. Klauser "Closed-Loop Laser Control System", vol. 24, No. 9, Feb. 1982, pp. 4691–4693.

Primary Examiner—Rodney B. Bovernick
Assistant Examiner—Robert McNutt
Attorney, Agent, or Firm—Sughrue, Mion, Zinn, Macpeak & Seas; Richard C. Turner; Peter A. McKenna

[57] ABSTRACT

An apparatus for and a method of controlling a laser oscillator for use as a laser source in a machining operation or the like is disclosed. In particular, the present invention compensates for a deviation of an actual input/output characteristic of a laser oscillator from a normal (expected) input/output characteristic due to, for example, aging and the like. The present invention approximates the actual input/output characteristic and stores the characteristic as a pattern in a storage device. In response to a detection of the actual laser output and an external intensity command signal, the present invention refers to the input/output characteristic pattern thus approximated and generates an input intensity command signal for controlling the laser oscillator to accurately produce the desired laser beam intensity irrespective of the deviation between the actual input/output characteristic and the normal characteristic.

6 Claims, 7 Drawing Sheets

FIG. 5(a) OPERATION INTERVAL TIME

FIG. 5(b) LASER OSCILLATOR INPUT SIGNAL

FIG. 5(c) LASER OUTPUT DETECTION SIGNAL

APPARATUS FOR AND METHOD OF CONTROLLING THE OUTPUT OF A LASER SOURCE

BACKGROUND OF THE INVENTION

1. Field of the Invention

The present invention relates to a laser oscillator output controlling apparatus. More specifically, the invention relates to a laser oscillator employed as a laser source for use in machining operations such as cutting a workpiece.

2. Description of the Background Art

Figure 9:
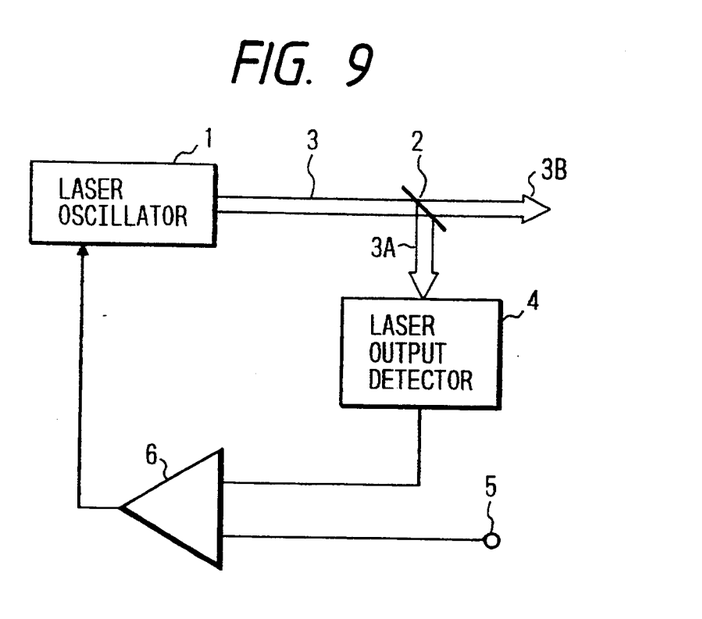
FIG. 9 is a block diagram illustrating the arrangement of a laser output controlling apparatus known in the art.

A conventional laser oscillator output controlling apparatus is shown in FIG. 9. In such apparatus, a part of the output 3 from laser oscillator 1 is diverted by a partial reflector 2 so that the intensity of the laser output 3 can be detected by a laser output detector 4. An error amplifier 6 compares an external intensity command 5 with the intensity of the laser output as detected by detector 4 and amplifies the resulting error value for input to the laser oscillator 1, thereby controlling the laser oscillator 1 to produce a laser output 3B with a desired intensity level.

Figure 10:
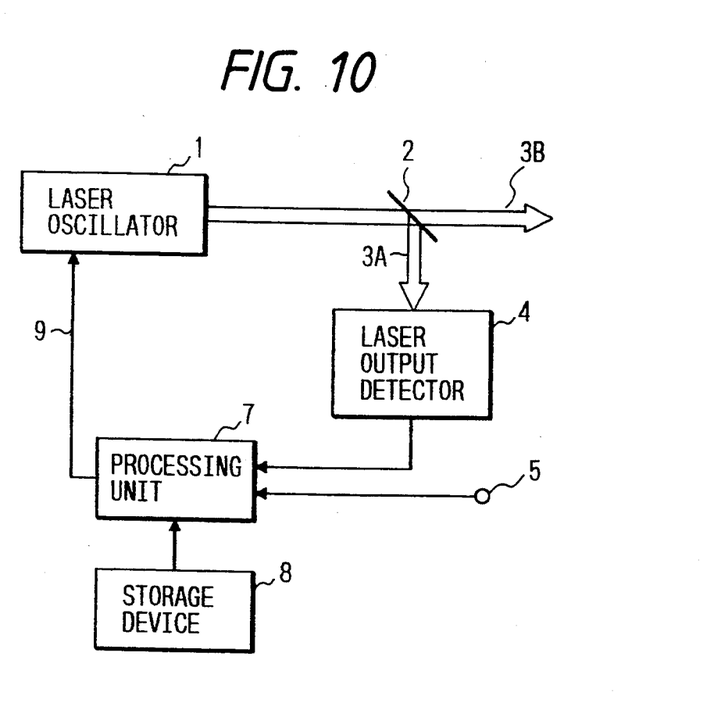
FIG. 10 is a block diagram illustrating the arrangement of another laser output controlling apparatus known in the art.

Since the laser output detector 4 includes a thermocouple, the controlling apparatus is slow in responding to a change in external intensity command 5. To overcome this problem, a laser output controlling apparatus as shown in FIG. 10 has been used. Such a conventional laser output controlling apparatus is disclosed, for example, in Japanese Patent Disclosure Publication No. 202794/1982, and U.S. Pat. No. 3,806,829.

As shown in FIG. 10, the controlling apparatus is composed of a laser oscillator 1, a partial reflector 2 for diverting a fractional part (e.g., 1 or 2%) of laser output 3 of the laser oscillator 1, a laser output detector 4 for detecting the intensity of the diverted beam 3A, an external intensity command 5 for controlling the intensity of the laser output 3, a processing unit 7 for receiving the output of the laser output detector 4 and the external intensity command 5, and a storage device 8 for storing the input/output characteristic (pattern) of the laser oscillator 1. In operation, the pattern stored in the input/output pattern storage device 8 is used by the processing unit 7 to determine an input laser oscillator signal based on the output of the laser output detector 4 and the command 5. The processing unit 7 outputs the resulting output pattern to the laser oscillator 1 as a laser oscillator input signal 9, thereby causing the laser output 3 of the laser oscillator 1 to change until it reaches the desired intensity value represented by the external intensity command 5.

The operation of the known laser output controlling apparatus arranged as described above will now be described in more detail with reference to FIG. 11(a), which illustrates the input/output characteristic of the laser oscillator 1 as a line through points a and b.

Assuming that the desired intensity of the laser output as represented by external command 5 is Ya, the required input (i.e., laser oscillator input signal 9) value of the laser oscillator 1 according to the input/output characteristic would be Xa. In a steady-state condition, the value of the external command 5 and the value of the laser output 3 are equal, i.e., both have axis value Ya. However, when the command 5 is suddenly changed to Yb, the processing unit 7 must now produce an output value Xb based on the pattern stored in storage device 8 and the command value Yb. By changing the laser oscillator input signal 9 of the laser oscillator to Xb the laser oscillator 1 is controlled to change the laser output 3 to the new desired value Yb.

In the above description, the line drawn through points a and b represents the normal input/output characteristic pattern of the laser oscillator 1. When the normal characteristic pattern has changed, however, the characteristic shifts to the line connecting points a' and b' in FIG. 11(a). Because of this change, the pattern stored in storage device 8 will not provide processing unit 7 with accurate characteristic data to produce a laser oscillator input signal. To overcome this problem, processing unit 7 automatically compensates for the shift so that the laser output 3 can be controlled to output the desired intensity irrespective of the shift in characteristics. This shift, however, must be detected prior to operation because the conventional apparatus does not perform the compensation in a case where the shift occurs during operation (e.g., while cutting a workpiece). In the conventional apparatus, no consideration is given to control in an on-line mode (i.e., when a workpiece is actually being cut using the laser beam output by the laser oscillator). Thus, it may be difficult to apply this type of controlling apparatus on-line.

The conventional laser output controlling apparatus arranged as described above has many other disadvantages. For example, the laser output detector 4 cannot accurately detect the value of the laser output 3 at the time the input signal 9 is changed (e.g., from Ya to Yb) because the detector employed has an inherent delay in responding to change in laser output. Specifically, when laser oscillator input signal 9 is received, laser oscillator 1 produces laser output 3. However, the speed of response of laser output 3 to the laser oscillator input signal 9 is quicker than the response speed of laser output detector 4 (i.e., the response speed of laser output detector 4 to laser output 3). When a desired value of output command 5 is given to processing unit 7, processing unit 7 refers to the input/output characteristic of the laser oscillator 1 stored in the output pattern storage device 8 and reads the value of laser oscillator input signal 9 corresponding to a desired value of output command 5 and sends it to the laser oscillator 1 as laser oscillator input signal 9. Specifically, this laser oscillator output controlling apparatus will not feedback control the laser output 3 to be a desired value of output command 5, based on the laser output value detected by laser output detector 4, but as described above, it will refer to an input/output characteristic of laser oscillator 1 stored in output pattern storage device 8 and will read the value of laser oscillator input signal 9 corresponding to a desired value of output command 5 and will send it to the laser oscillator 1. It is not a feedback control. And furthermore, as described above, response speed of laser output 3 to laser oscillator input signal 9 is so fast as to be almost instantaneous. Therefore, even if laser output detector 4 cannot accurately detect the value of laser output 3, even if a detector which is slow in responding is used, laser oscillator input signal 9 can be set irrespective of the output of laser output detector 4 by processing unit 7 and can control laser output 3 at high speed.

Figure 11A:
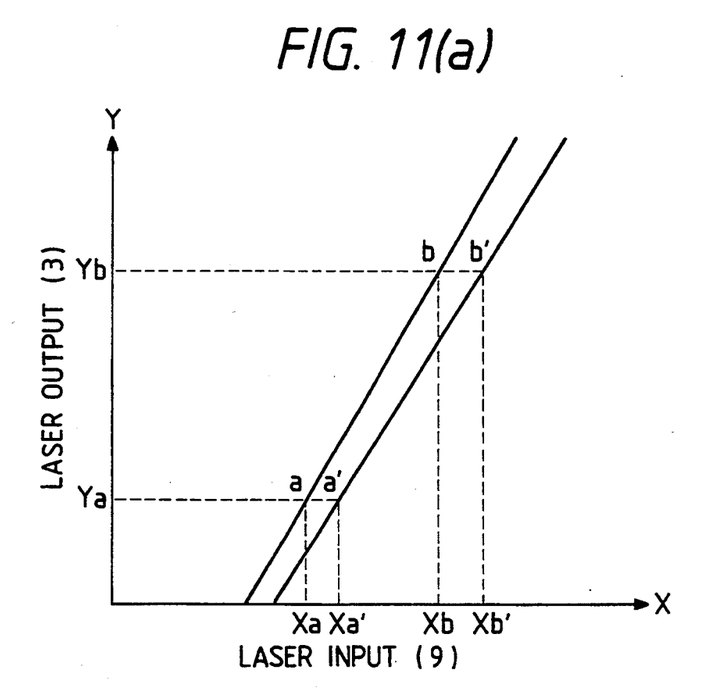
FIGS. 11(a) and 11(b) are graphs illustrating normal (expected) and actual laser oscillator characteristics, respectively.
Figure 11B:
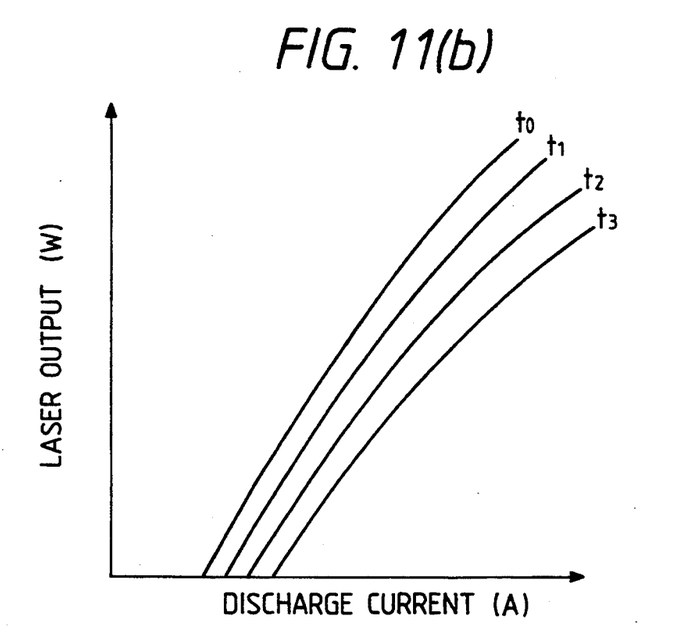

Also, while the normal (expected) input/output characteristic of the laser oscillator in FIG. 11(a) is linear, the actual input/output characteristic of the laser oscillator 1 may be one of a plurality of complicated curves, as shown in FIG. 11(b). The actual input/output characteristic of the laser oscillator 1 departs from the linear representation shown in FIG. 11(a) because of the effects of aging and the like. For example, as shown in FIG. 11(b), the input/output characteristics of a gas closed-type carbon dioxide ($CO_2$) laser oscillator changes with the increase of time t. As the laser oscillator ages, the intensity of the output decreases for a given amount of excitation so that it is necessary to increase the excitation (i.e., laser oscillator input signal value) in order to compensate for the decreasing intensity caused by aging. Thus, when time passes from $t_0$ through $t_3$ the threshold excitation values (i.e., the values in which the laser output is generated) move towards the right and each subsequent characteristic curve has a gentler slope. Thus, as the laser oscillator 1 ages, the actual input/output characteristic departs from the normal input/output characteristic. Without compensating for this departure, a large error may occur in using the laser oscillator as a source in a machining operation or the like.

Moreover, the conventional apparatus is not provided with a function capable of indicating in a certain form that the input/output characteristic of the laser oscillator diverges significantly from a normal (expected) input/output characteristic, and thus the existence of such divergence is not known to an operator, thereby posing a problem in practical use. Also, the use of the laser apparatus under such divergent conditions may prevent adequate protection of oscillator energizing power supply hardware.

SUMMARY OF THE INVENTION

It is accordingly an object of the present invention to overcome the problems and disadvantages of the prior art discussed above.

An object of the invention is to provide an apparatus and method which allows the laser output of a laser oscillator to accurately respond to an external intensity command by basing the laser oscillator input signal on an approximation of the actual input/output characteristic of the laser oscillator.

A further object of the invention is to provide an apparatus which applies a specific compensation process under actual cutting conditions, i.e., while a laser beam is used as a source output to cut an external workpiece.

Yet another object of the invention is to employ specific compensation processes both under non-cutting (off-line) conditions (i.e., while a laser beam is not output to an external workpiece), and also under actual cutting conditions (on-line mode) (i.e., while the laser beam is output to the external workpiece).

An additional object of the invention is to provide an apparatus and method which displays an error when the detected input/output characteristic of a laser oscillator has departed considerably from a normal input/output characteristic.

In accordance with the present invention, an apparatus is provided which approximates the actual input/output characteristic of a laser oscillator. In the invention, a plurality of laser oscillator input command signal values are input to a laser oscillator and a plurality of output signal values respectively output from the laser oscillator in response to the input command signals are detected and used to approximate the input/output characteristic pattern of the laser oscillator. The characteristic pattern thus approximated is then stored in a storage device prior to use in an on-line mode.

In another aspect of the present invention, a compensation operation is carried out only when a laser oscillator input command signal value Is(Tn) is approximately equal to the input command signal value Is(Tn+t). When the compensation operation is performed, the laser oscillator input command signal value Is(Tn+t) at a time (Tn+t) (where time t is smaller than time T) and the corresponding output detection signal value Wr(Tn+t) of the laser output detector, which have been previously stored in a storage device, are used in the compensation operation.

In yet another aspect of the present invention, the laser output controlling apparatus offers automatic compensation for the input/output characteristic of the laser oscillator by employing specific compensation processes in both off-line and on-line modes for automatically compensating for the input/output characteristic of the laser oscillator.

In an additional aspect of the present invention, the apparatus provides a certain error display when the input/output characteristic of the laser oscillator has departed considerably from a normal (expected) characteristic, thereby ensuring protection of an oscillator energizing power supply.

DESCRIPTION OF THE PREFERRED EMBODIMENTS

Figure 1:
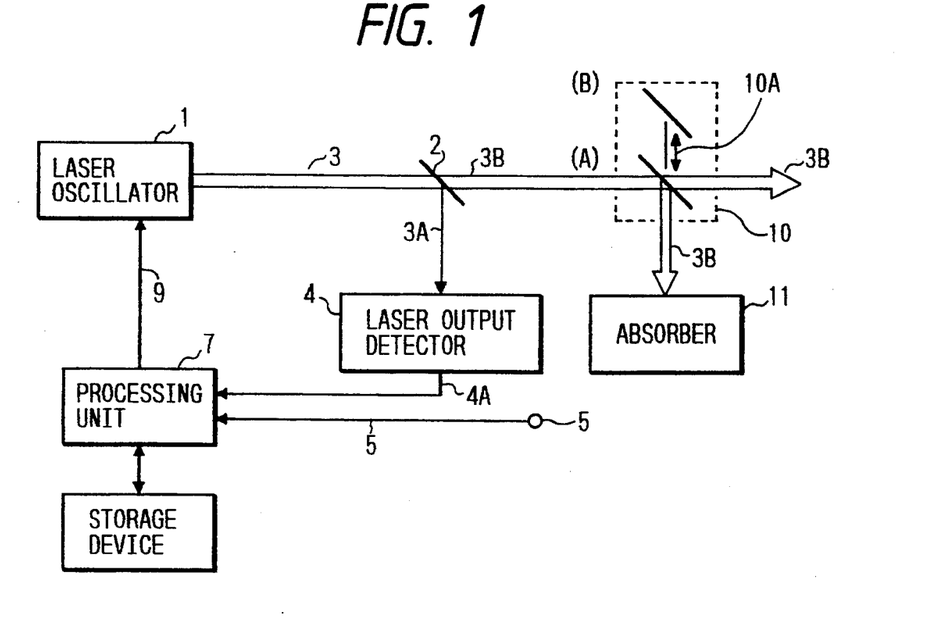
FIG. 1 is a block diagram of an apparatus illustrating a preferred embodiment of invention.

A first embodiment of the present invention will be described with reference to FIG. 1. In the Figure, a fractional part 3A of a laser beam output 3 that is output from a laser oscillator 1 is diverted by a partial reflector 2 and is detected by a laser output detector 4, e.g., comprising a thermocouple, to detect the intensity of the laser output 3. Laser beam 3B is the remaining portion of laser output 3 that is passed (not diverted) by partial reflector 2. The output signal 4A of the laser output detector 4 has a signal output detection value that is proportional to the intensity of the laser output 3. The output 4A of the laser output detector 4 and an external intensity command 5, which is a voltage signal proportional to a desired laser intensity (energy level) output, are input to a processing unit 7. The input/output characteristic pattern of the laser oscillator 1 is stored prior to operation in a storage device 8. This input/output characteristic pattern also is fed to the processing unit 7, which is designed to produce a laser oscillator input signal 9 based on the stored input/output characteristic pattern, the output detection value, and the intensity command 5. In this embodiment, the processing unit 7 and storage device 8 may be implemented by microprocessors, allowing their control functions to be changed easily by changing microcode (programs) in a manner well known in the art.

Along the optical axis of the laser beam 3 is installed a total reflector apparatus 10. The reflector apparatus 10 is composed of a mechanism which allows a total reflector surface to be disposed either in a first position for reflecting 100% of laser beam portion 3B along a path 10A, or in a second position for transmitting the laser beam 3B without reflection, as designated by a controller (not shown). When the beam 3B is reflected by the total reflector apparatus 10, the optical axis of the reflected light path 10A will be at a given angle with respect to the optical axis of the laser beam 3B. Along the reflected light axis is an absorber 11 which is disposed so that the reflected light is incident thereon and totally absorbed.

In the first position, no laser output reaches an intended target (e.g., workpiece to be cut). Thus, the workpiece may be safely placed in front of the controlling apparatus in the proper position to receive the laser beam when the controller moves the total reflector 10 to the second position.

Figure 2:
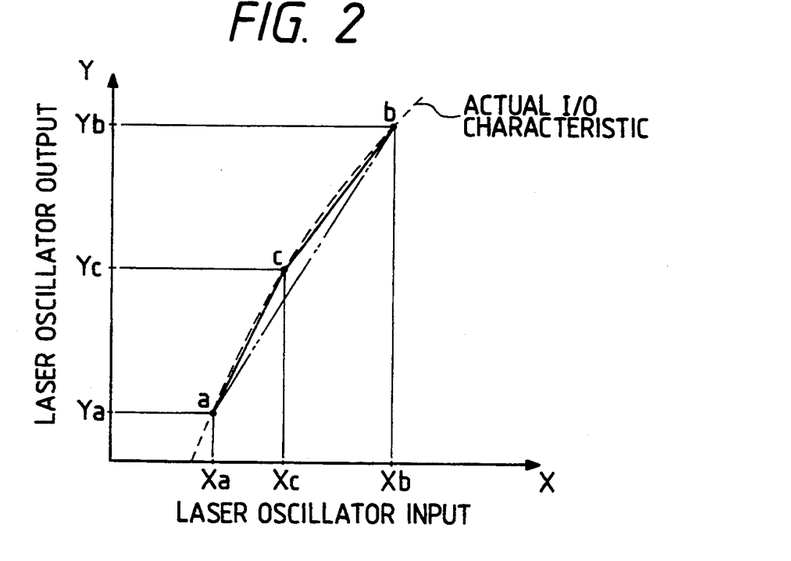
FIG. 2 is a graph illustrating an actual input/output characteristic of a laser oscillator as approximated in accordance with the present invention.
Figure 3:
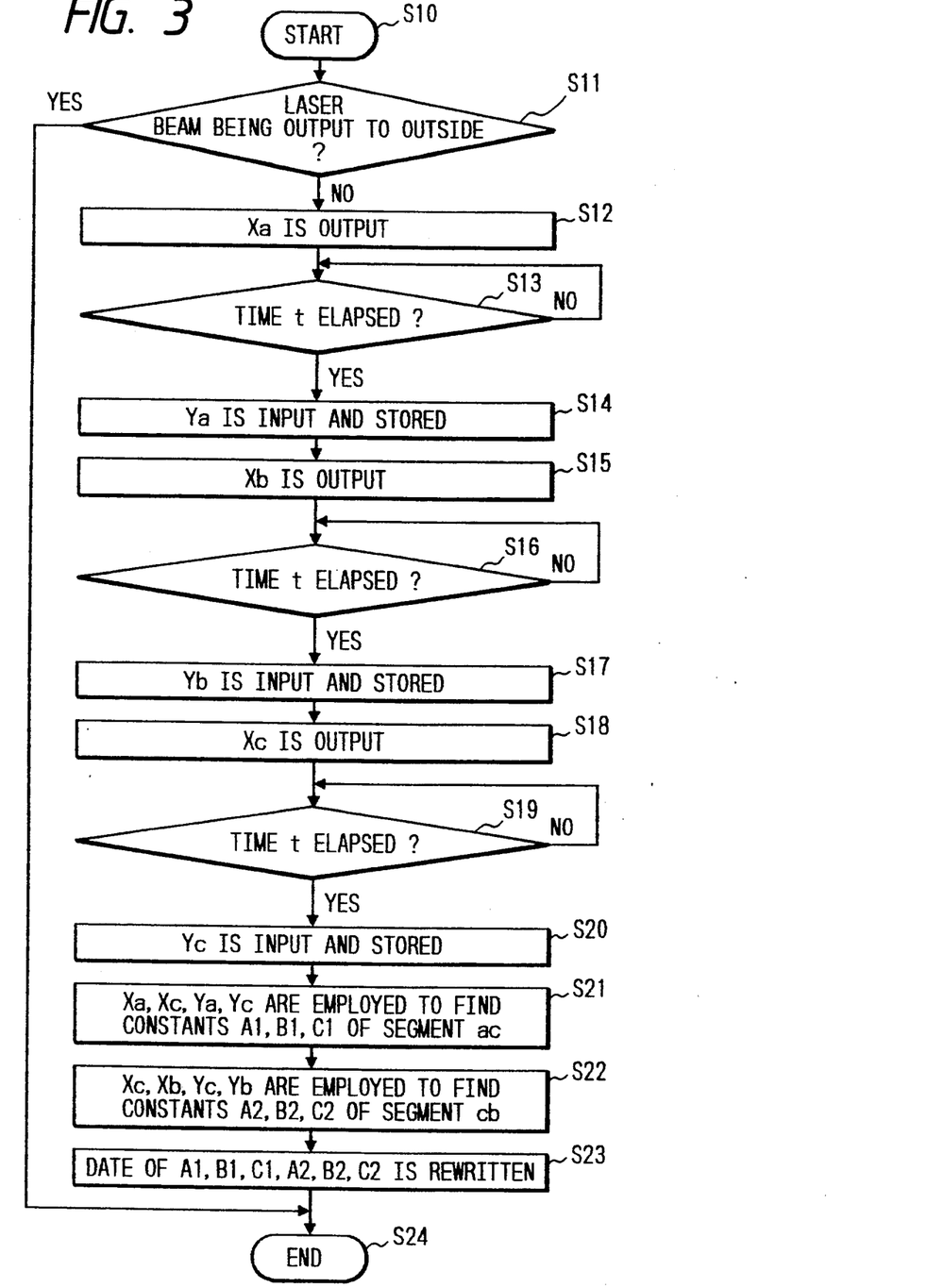
FIGS. 3 and 4 are flowcharts showing the operational flow of the preferred embodiments of the invention.

The operation of the first embodiment will now be described with reference to FIGS. 2 and 3. First, an operation for approximating the input/output characteristic pursuant to the present invention will be described in accordance with FIG. 3. FIG. 3 is a flowchart illustrating the operational flow of the apparatus shown in FIG. 1. This operation may be controlled by a program stored in the storage device 8 as microcode.

Following a start of the program at step S 10, the apparatus determines whether the laser beam is being output to an external target (e.g., workpiece), step S 11. If the laser beam 3B output by the laser oscillator 1 is being reflected by the total reflector apparatus 10 into the absorber 11, i.e., off-line mode; when actual cutting is not carried out, the processing unit 7 outputs a signal value Xa to the laser oscillator 1 as the laser oscillator input signal 9 at step S 12. After waiting for a predetermined period of time t in a subsequent step S 13, where t corresponds to the time constant or response delay of the laser output detector 4, the processing unit 7 receives a laser output signal value Ya from laser output detector 4. This signal value Ya is output in response to laser oscillator input signal Xa. The processing unit 7 then stores both the input value Xa and corresponding output value Ya in the storage device 8 as a data pair (Xa, Ya) at step S 14. Similarly, in steps S 15-17 and steps 18-20, respectively, laser outputs Yb and Yc responsive to laser oscillator input signals Xb and Xc are input and stored in the storage device 8 as data pairs (Xb, Yb) and (Xc, Yc), respectively. Thus, three different laser oscillator output values responsive to three arbitrary laser oscillator input signals (input command values) are obtained.

Using the three data pairs thus obtained, the processing unit 7 determines the input/output characteristic of laser oscillator 1 which is actually represented by a curve. In particular, processing unit 7 determines the actual input/output characteristic by approximating the curve using two segments based on the three data pairs thus obtained. A first segment ac shown in FIG. 2 is determined by employing data pairs (Xa, Ya) and (Xc, Yc), in step S 21. This segment ac can be represented by the following linear expression:

$$X = (A1/B1)*Y + C1 \tag{1}$$

wherein,
A1 = Xc − Xa
B1 = Yc − Ya
C1 = Xc − (A1/B1)*Yc

Similarly, a segment cb is determined by employing data pairs (Xc, Yc) and (Xb, Yb), in step S 22. This segment cb can be represented by the following linear expression:

$$X = (A2/B2)*Y + C2 \tag{2}$$

wherein,
A2 = Xb − Xc
B2 = Yb − Yc
C2 = Xb − (A2/B2)*Yb

In accordance with the present invention, the input/output characteristic of the laser oscillator is approximated by two segments using the three data pairs obtained above. As is clear from FIG. 2, the actual input/output characteristic can be more accurately represented by the two segments than by a single straight line ab, as in the conventional apparatus.

After approximating the actual input/output characteristic of the laser oscillator, the approximated characteristic is stored in storage device 8 in step S 23. During initialization of the controlling apparatus, the approximation data is stored in the storage device 8 as an original input/output characteristic. However, it should be noted that the procedure may be repeated at predetermined intervals T so as to provide an approximate representation of the actual input/output characteristic under the most recent conditions of the laser oscillator. The program comes to an end at step S 24 when the approximation is rewritten, or when it is determined at step S 11 that the laser output is applied to a target (e.g., workpiece).

A compensating operation in the on-line mode (e.g., when a laser output is applied to a target) will now be described in accordance with FIG. 4, which is a flowchart illustrating the operational flow of the apparatus shown in FIG. 1, after a start at step S 30. When the laser beam 3B output by the laser oscillator 1 is being output intact without being reflected by the total reflector 10, as determined in step S 31, the processing unit 7 is enabled. At step S 32, the unit 7 stores a laser oscillator input command as a value Is(T1) and stores a corresponding output intensity detection signal 4A as value Wr(T1) at time T1 at step S 33. The processing unit 7 then waits for time t, beginning at T1 at step S 33, after which time it stores an input command value Is(T1+t) and corresponding output detection value Wr(T1+t) at time T1+t in the storage device 8 at step S 34. At step S 35, the processing unit 7 determines whether the input command value Is(T1) is equal to or approximately equal to the input command value Is(T1+t). If the input command value Is(T1) is not equal to the input command value Is(T1+t) (the NO path at step S 35), the compensation operation is not carried out and the program returns to step S 31. Where the compensation value for the compensation operation is determined at step S 36, the value is added to or subtracted from the input/output characteristic of the laser oscillator already stored (i.e., before T1) in the storage device 8 at step S 37.

As stated above, at predetermined time intervals of period T, as determined at step S 38, the above sequence is repeated by returning to step S 31. For example, at time T2, a laser oscillator input command value Is(T2) and an output detection value Wr(T2) are stored into the storage device 8. At time T2+t, the processing unit 7 stores an input command value Is(T2+t) and an output detection value Wr(T2+t) in the storage device 8, and the remaining steps are performed in a similar manner as described above. The flow ends at step S 39 when it is determined at step S 31 that the laser beam 3B is not externally transmitted outside the apparatus (e.g., to a workpiece).

Figure 4:
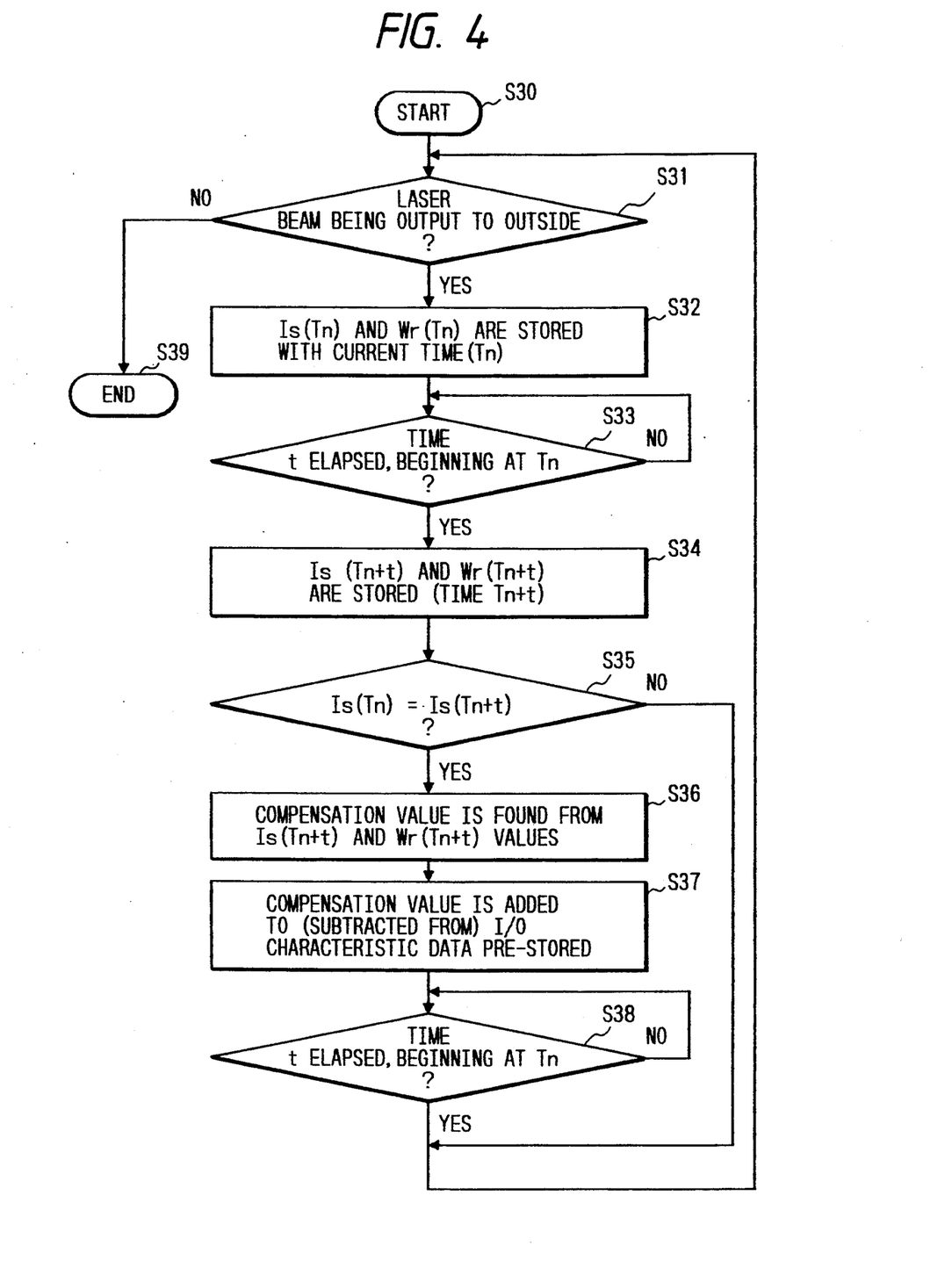
Figure 5A:
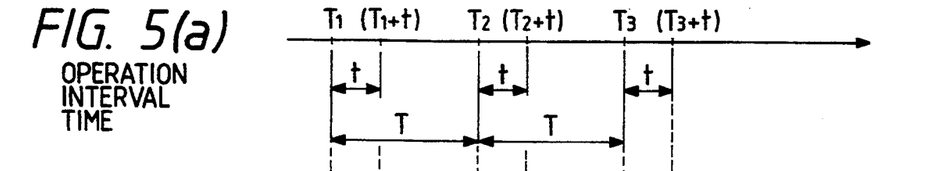
FIGS. 5(a) to 5(c) illustrate a laser oscillator input signal and a laser output signal at compensation operation intervals and time periods in accordance with the invention.
Figure 5B:
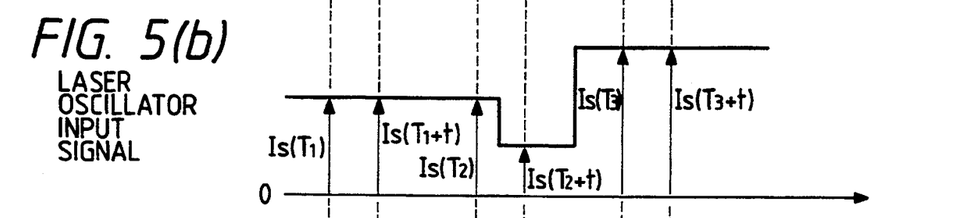
Figure 5C:
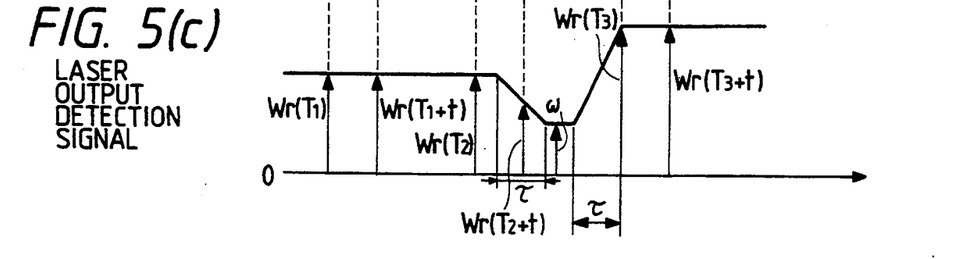

The sequence of operations, in FIGS. 3 and 4 may be further understood with reference to FIGS. 5(a)–5(c). Referring to FIGS. 5(a) and 5(b), Is(T1) is equal to Is(T1+t) at time T1+t, therefore, the compensation operation can be performed.

As in the conventional apparatus, the processing unit 7 automatically compensates the input/output characteristic pattern stored in the storage device 8 by adding or subtracting a compensation value to the laser oscillator input signal 9 determined from the stored pattern. At time T2+t, however, Is(T2) is not equal to Is(T2+t), thus, the processing unit 7 of the present invention will not perform the compensation operation. In particular, when the input signal corresponds to Is(T2+t), the laser output detection signal is expected to be, for example, a value "w." However, as shown in FIG. 5(c), the detection value 4A of the laser output signal at that time has not yet reached "w," and is instead a value Wr(T2+t) due to the slow response of the laser output detector 4. Clearly, "w" is not equal to Wr(T2+t). Thus, if compensation is made at time T2+t, an incorrect compensation value may result because, as will be described in more detail below, the compensation value is related to the actual laser output signal detected. Thus, the time t must be chosen such that it is larger than the time constant (delay) $\tau$ of the laser output detector 4 in order to ensure that the compensation operation is performed correctly.

Figure 6:
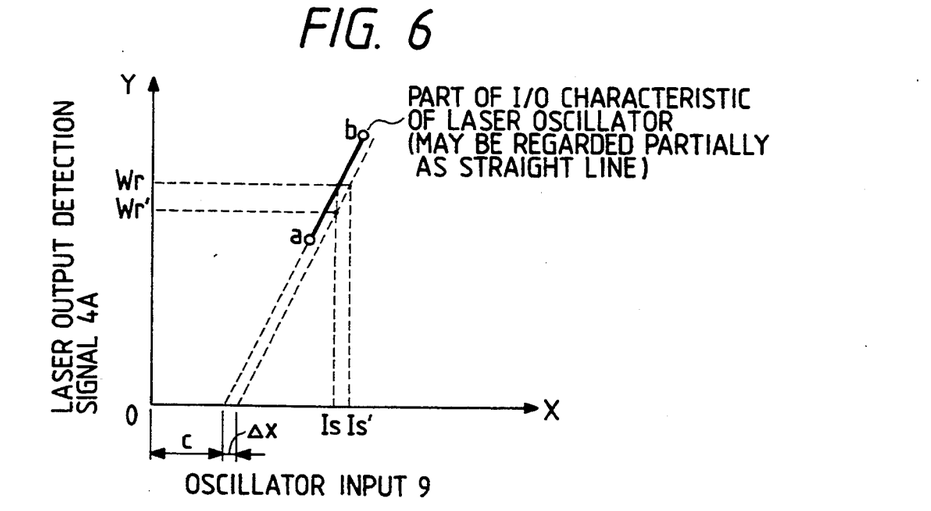
FIG. 6 is a graph illustrating a compensation value for the laser oscillator input signal.

A method of finding the compensation value will now be described in accordance with FIG. 6, which is a graph showing the laser oscillator input signal 9 in the X axis and the output detection signal of the laser output detector 4 in the Y axis. A segment ab is part of the input/output characteristic of the laser oscillator as stored prior to operation in the storage device 8. If the segment ab is approximated by a linear expression, it is represented as follows:

$$X = (A/B)*Y + C \qquad (3)$$

wherein,
A = Xb − Xa
B = Yb − Ya
C = Xb − (A/B)*Yb Supposing Is is a laser oscillator input signal 9 stored in the storage device 8 as corresponding to an external intensity command having a desired value Wr, when the actual laser output detection signal is Wr' (on the assumption that Wr is greater than Wr'), a compensation value Δx for the laser oscillator input signal 9 is found by the following expression:

$$\Delta x = (Wr - Wr')*A/B \qquad (4)$$

Hence, a laser oscillator input signal value Is' corresponding to the desired laser intensity Wr is given by the following expression:
Is' = Is + Δx Thus, if the laser oscillator characteristic changes while the control apparatus is in an on-line mode (i.e., when a cutting operation is actually performed), the laser oscillator input signal 9 can be continuously compensated for at intervals of predetermined time T to maintain the proper relationship between input command 5 and laser output 3, unlike the conventional apparatus.

An operation using both the function of approximating the input/output characteristic in the off-line mode and also the function of compensating the laser output in the on-line mode will now be described. When the laser beam 3B is not output to the outside target (off-line mode), laser output values corresponding to laser oscillator input command values at an arbitrary three or more points are stored and then employed to approximate the actual input/output characteristic pattern of the laser oscillator as described above. When the laser beam 3B is output to the outside target (on-line mode), a laser oscillator input command value Is(Tn) at intervals of given time T and a corresponding laser output detection value Wr(Tn) are stored, and an input command value Is(Tn+t) and a corresponding laser output value Wr(Tn+t) are also stored. Only when the input command value Is(Tn) is equal to or approximately equal to the input command value Is(Tn+t) is the compensation operation carried out.

Figure 7:
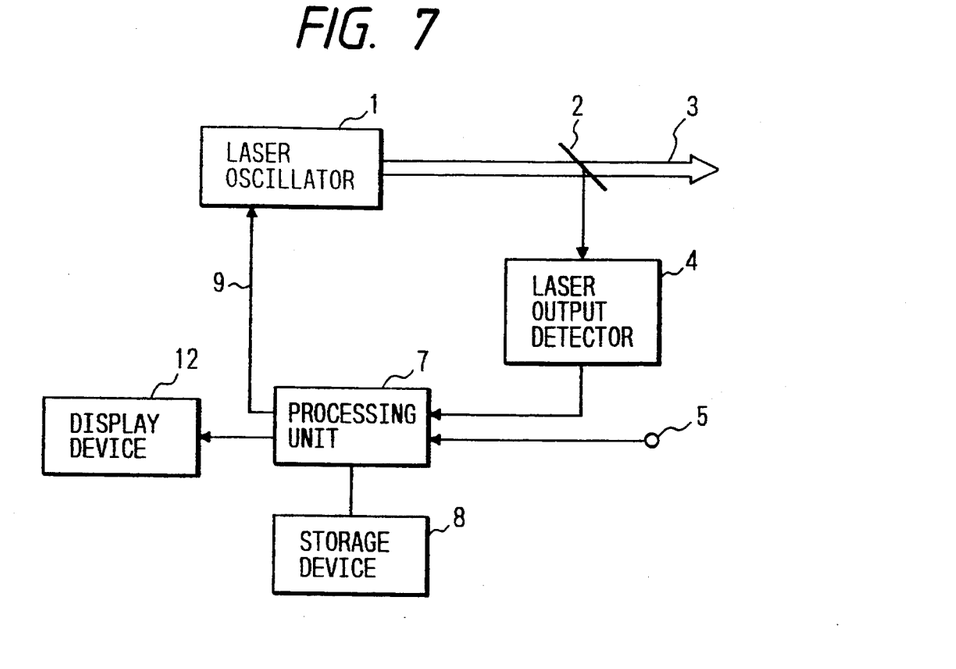
FIG. 7 is a block diagram of an apparatus illustrating a preferred embodiment of an invention.
Figure 8:
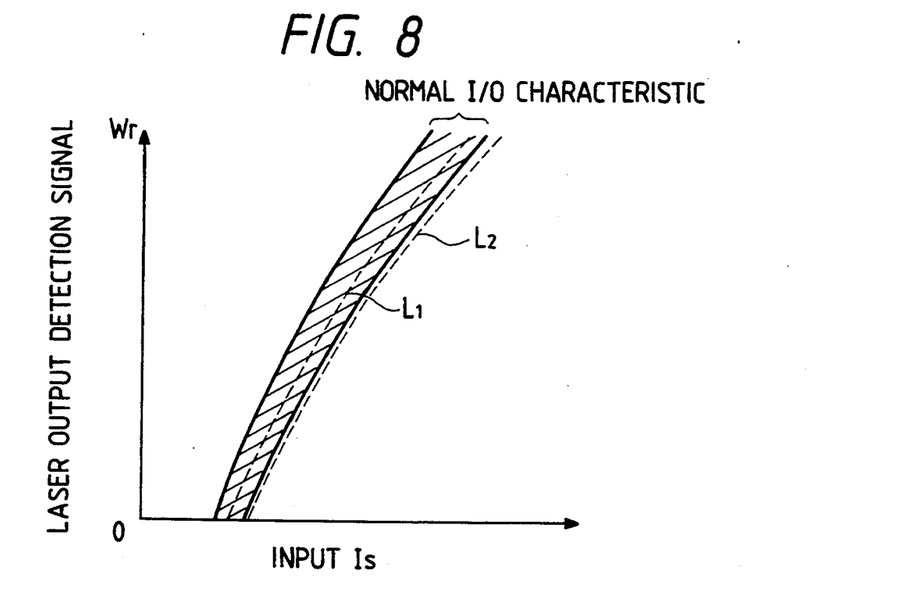
FIG. 8 is a graph illustrating a range of normal input/output characteristics of a laser oscillator.

A second embodiment of the present invention will now be described in accordance with FIGS. 7 and 8. This second embodiment differs from the above described embodiment mainly in that it is equipped with a display device. Prior to the cutting operation, a plurality of normal (expected) input/output characteristic patterns having an optional limited range (width) as shown by the hatched area between the solid lines in FIG. 8 are stored in storage device 8. A processing unit 7 determines the actual input command value 9 to a laser oscillator 1. The intensity of a laser beam 3 output by the laser oscillator 1 in response to the input command value 9 is detected by a laser output detector 4. Employing each of the detected laser output value and input command value, the processing unit 7 determines the actual input/output characteristic pattern of the laser oscillator 1.

The processing unit 7 provides a certain error display (e.g., an optical signal or a contact signal) on a display device 12 when the input/output characteristic of the laser oscillator found by the operation has departed from the prestored range of normal characteristic patterns. When, for example, the actual laser oscillator input/output characteristic is found to be on line L1, the processing unit 7 determines that the characteristic pattern falls within the range of normal input/output characteristics, and thus no error display is provided on the display device 12. However, where the characteristic pattern is found to be outside of the hatched area (e.g., L2), the display device 12 displays an error signal to alert the operator of a departure from the normal input/output characteristic range. Having been alerted of an error, the operator can immediately terminate the cutting operation to avoid any harm to the controlling apparatus, machine tool, power supply, etc.

Having described the preferred embodiments of the present invention, it is believed obvious that other modifications and variations of the invention are possible in light of the above teachings. It is therefore to be understood that changes may be made in the particular embodiment of the invention described which are within the full intended scope of the invention as defined by the appended claims.

What is claimed is:

1. A laser output controlling apparatus for controlling intensity of a laser beam output from a laser source in response to an external command specifying a desired level of intensity of the laser beam output, the controlling apparatus comprising:
    a laser output detector detecting the intensity of the laser beam output by said laser source, and generating a detection output signal representative of the intensity thus detected;
    a processing unit determining an input intensity command signal for controlling said laser oscillator based on at least the detection output signal of said laser output detector and the external command, wherein said processing unit determines an input/output characteristic pattern of said laser oscillator using at least three of a plurality of input intensity command signals used to control said laser oscillator, and using at least three of a plurality of laser beam output signals output by said laser oscillator in response to respective ones of said plurality of input intensity command signals, said processing unit outputting said intensity command signal to said laser oscillator on the basis of the input/output characteristic pattern thus determined;
    a storage device used to store said input/output characteristic pattern determined by said processing unit, wherein the laser source for generating the laser beam output is a laser oscillator, and wherein said processing unit performs a compensation operation that compensates the input intensity command signal determined on the basis of the stored characteristic pattern to compensate the intensity command signal for a shift of an input/output characteristic of the laser oscillator from the time said processing unit determined and stored the pattern in said storage device, said compensation operation being performed only when a detection output signal from said laser output detector is the same at time T as it is at a later time T+t.

2. The laser output controlling apparatus as defined in claim 1, wherein said processing unit approximates the input/output characteristic of the laser oscillator when the laser beam output by the laser oscillator is not externally output by the laser output controlling apparatus, said processing unit determines the input/output characteristic pattern of said laser oscillator using at least three sampled values of the input intensity command signal and at least three corresponding laser beam output signals, and wherein said processing unit determines whether or not to perform the compensation operation at intervals of predetermined time T, wherein T is a time period larger than t, wherein t is a time constant that is greater than or equal to a response delay of said laser output detector.

3. A laser output controlling apparatus for controlling intensity of a laser beam output from a laser source in response to an external command specifying a desired level of intensity of the laser beam output, the controlling apparatus comprising:
    a laser output detector detecting the intensity of the laser beam output by said laser source, and generating a detection output signal representative of the intensity thus detected;
    a processing unit determining an input intensity command signal for controlling said laser oscillator based on at least the detection output signal of said laser output detector and the external command, wherein said processing unit determines an input/output characteristic pattern of said laser oscillator using at least three of a plurality of input intensity command signals used to control said laser oscillator, and using at least three of a plurality of laser beam output signals output by said laser oscillator in response to respective ones of said plurality of input intensity command signals, said processing unit outputting said intensity command signal to said laser oscillator on the basis of the input/output characteristic pattern thus determined; and
    a display device, coupled to said processing unit, displaying an error condition when the input/output characteristic pattern determined by said processing unit is beyond a range of patterns determined by said processing unit and stored in said storage device.

4. A method of controlling a laser source to output a laser beam with a controlled intensity in accordance with an external command specifying a desired level of intensity of the laser beam output, the method comprising the steps of:
    detecting the intensity of the laser beam output by said laser source, and producing a laser intensity output signal representative of the intensity thus detected;
    receiving said laser intensity output signal and the external command;
    producing an input intensity command signal based on said laser intensity output signal and the external command;
    forming a plurality of data pairs by arbitrarily sampling a plurality of input intensity command signals and sampling corresponding laser output signals produced in response to said plurality of input intensity command signals;
    approximating an input/output characteristic pattern of said laser source on the basis of at least three of said plurality of data pairs formed, wherein the step of producing an input intensity command signal is performed on the basis of the input/output characteristic pattern thus approximated, and wherein said approximating step is performed with at least intensity command signals used to form a plurality of line segments for approximating the input/output characteristic pattern of said laser source; and
    compensating the input intensity command signal by performing the steps of:
        (a) comparing a detected output intensity signal corresponding to an input intensity command with a stored output intensity signal corresponding to the same input intensity command;
        (b) calculating an input intensity compensation signal based upon the result of the above comparison; and
        (c) summing the input intensity compensation signal with the input intensity command signal to produce a compensated input intensity command signal.

5. The method of controlling a laser source as recited in claim 4, wherein the step of compensating is performed only if the input intensity command signal at a time T is substantially equal to the input command signal at a time T+t.

6. The method of controlling a laser source as recited in claim 5, further comprising the steps of:
  storing a range of input/output characteristics of said laser source; and
  producing an error display if the input/output characteristic pattern produced in said approximating step is beyond said range of input/output characteristics, wherein said laser source is a laser oscillator.

* * * * *